United States Patent [19]

Brusasco

[11] 4,138,902
[45] Feb. 13, 1979

[54] SCREW-NUT SCREW TRANSMISSION COUPLING WITH BALL CIRCULATION

[75] Inventor: Enzo Brusasco, Turino, Italy

[73] Assignee: Roltra S.p.A., Milan, Italy

[21] Appl. No.: 823,238

[22] Filed: Aug. 9, 1977

[30] Foreign Application Priority Data

Nov. 19, 1976 [IT] Italy .............................. 69764 A/76

[51] Int. Cl.² .......................... F16H 1/18; F16H 55/22
[52] U.S. Cl. .................................... 74/424.8 R; 74/459
[58] Field of Search ............... 74/459, 424.8 R, 424.5, 74/424.7, 439

[56] References Cited
U.S. PATENT DOCUMENTS 3,186,082  6/1965  Ulrich, Jr., et al. ............ 74/424.7 X Primary Examiner—Leonard H. Gerin Attorney, Agent, or Firm—Ladas, Parry, Von Gehr, Goldsmith & Deschamps

[57] ABSTRACT

A screw-nut screw transmission coupling with ball circulation of the type comprising a first elongated element and a second tubular element substantially coaxial to each other and with an external and an internal helical track respectively, is described. Said two tracks are disposed facing each other to define a helical rolling path for a plurality of balls disposed in mutual contact along said path and along a recirculation duct connecting the two ends of said path together, and said first element is constituted by an inner core and a metal strip wound in a cylindrical helix about and along said core, said strip being rigid with said core and having a cross-section which is concave outwards to define one of said helical tracks.

8 Claims, 4 Drawing Figures

SCREW-NUT SCREW TRANSMISSION COUPLING WITH BALL CIRCULATION

BACKGROUND OF THE INVENTION

This invention relates to a screw-nut screw coupling with ball circulation, of the type comprising a first and second element mutually coupled via a plurality of balls, in such a manner that a rotary movement of the one leads to a corresponding translatory movement of the other.

In particular, the present invention relates to a screw-nut screw coupling with ball circulation, of the type comprising a first elongated element and a second tubular element substantially coaxial to each other and with an external and an internal helical track respectively, said two tracks being disposed facing each other to define a helical rolling path for a plurality of balls disposed in mutual contact along said path and along a recirculation duct connecting the two ends of said path together.

In couplings of the aforesaid type, a rigid round bar or rod may be used for said first element, comprising an outer helical groove acting as a track for the spheres and constructed by mechanical machining.

In order to obviate the drawbacks and relatively high cost involved in the said mechanical machining, it is known to use for said first element a screw consisting of a rigid core, e.g. a round bar, or a flexible core, e.g. a metal cable, about which a generally metal wire is spirally wound in the form of a spring, in which each pair of adjacent turns defines a portion of said helical track. Finally, by precompressing said spring, it has recently been possible to dispense with the said inner core and construct the said first element solely from a spirally wound metal wire, in which the adjacent turns are disposed in contact with each other.

Constructing the helical track for the spheres by means of a spirally wound metal wire has the disadvantage of allowing only screws with a relatively small pitch to be made, as this latter is a direct function of the diameter of the wire used and may vary from a minimum equal to the diameter of the wire used (when the spring is precompressed) to a maximum generally equal to two or three times said diameter.

SUMMARY OF THE INVENTION

The object of the present invention is to provide a screw-nut screw coupling with ball circulation of the type specified heretofore, wherein said first element, although of relatively low manufacturing cost, enables the screw pitch to be constructed of any desired length.

Said object is attained by the coupling of the type heretofore specified according to the present invention, in that said first element is constituted of an inner core, which may be rigid or flexible, and a metal strip wound in a cylindrical helix about and along said core, said strip being rigid with said core and having a cross-section which is concave outwards to define one of said helical tracks.

Preferably, the other of said tracks is defined by a second metal strip wound in a cylindrical helix along an inner face of a tubular support member through which said first element extends, said second strip having a cross-section which is concave inwards.

Further characteristics and advantages of the present invention will be evident from the description given hereinafter with reference to the accompanying drawings, which show some non-limiting embodiments thereof, and in which:

DETAILED DESCRIPTION OF THE INVENTION

Figure 1:
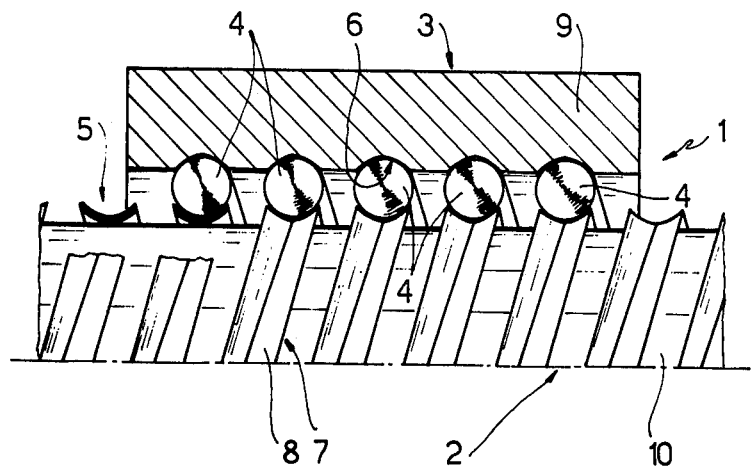
FIG. 1 is an axial section through a screw-nut screw coupling with ball circulation constructed in accordance with the present invention.

FIG. 1 shows a screw-nut screw coupling indicated overall by 1 and comprising a screw 2 and a nut screw 3 coupled together via a plurality of balls 4 disposed in mutual contact along a helical rolling path 5. This latter is defined externally by a helical track 6 carried by the nut screw 3, and internally by a helical spring 7 disposed facing the track 6 and constituted by a strip 8 of metal material, preferably hardened sheet metal. Said strip 8 is bent transversely so as to give a concave surface on the side facing the balls 4. In the particular example illustrated, the strip 8 has a cross-section substantially of V shape, but any other concave cross-section may be used which enables the balls 4 to roll along the path 5 and to be contained laterally within the path.

In the example illustrated, the track 6 is formed inside a tubular member which is illustrated diagrammatically in the form of a simple sleeve 9 of rigid material. This latter is provided with a recirculation duct (not shown) extending between the two ends of the path 5 and constituting with this latter a rolling circuit for the balls 4.

With regard to the nut screw 3, it is important to note that this may have a different structure from that shown in FIG. 1. In particular, any one of the designs described and claimed in Italian patent application No. 68870-A/76, filed on 27 July 1976 by the same applicant, may be used for the nut screw 3.

The spring 7 is wound about a cylindrical core 10 and is connected rigidly to this latter over its entire length. The core 10 may consist of a rigid or resiliently bendable round bar, or, in accordance with modifications not shown, a plurality of flexible rods coupled together, or a flexible metal cable. According to one particular modification (not shown), the core 10 is constituted by a plastics coated metal cable. In all cases, independently of its structure, the core 10 must preferably possess the characteristic of having substantially no expansion when subjected to normal axial working loads.

By winding and fixing the strip 8 on to the core 10, it is possible to construct relatively cheaply a screw 2 which is not only extremely accurate but also has a pitch of any desired length, independent of the width of the guide track for the balls 4.

Figure 2:
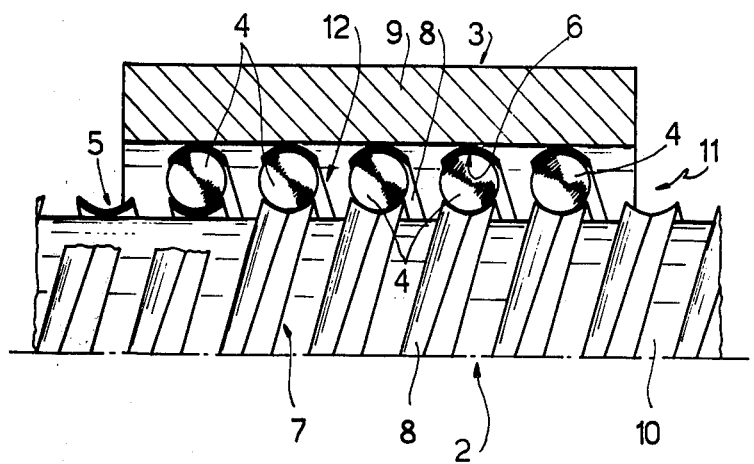
FIG. 2 ia an axial section through a first modification of the coupling shown in FIG. 1.

FIG. 2 shows a screw-nut screw coupling indicated overall by 11 and very similar to the coupling 1, the only difference being that the track 6 is here defined by a spring 12 similar to the spring 7 and rigid over its entire length with the inner surface of the sleeve 9.

Figure 3:
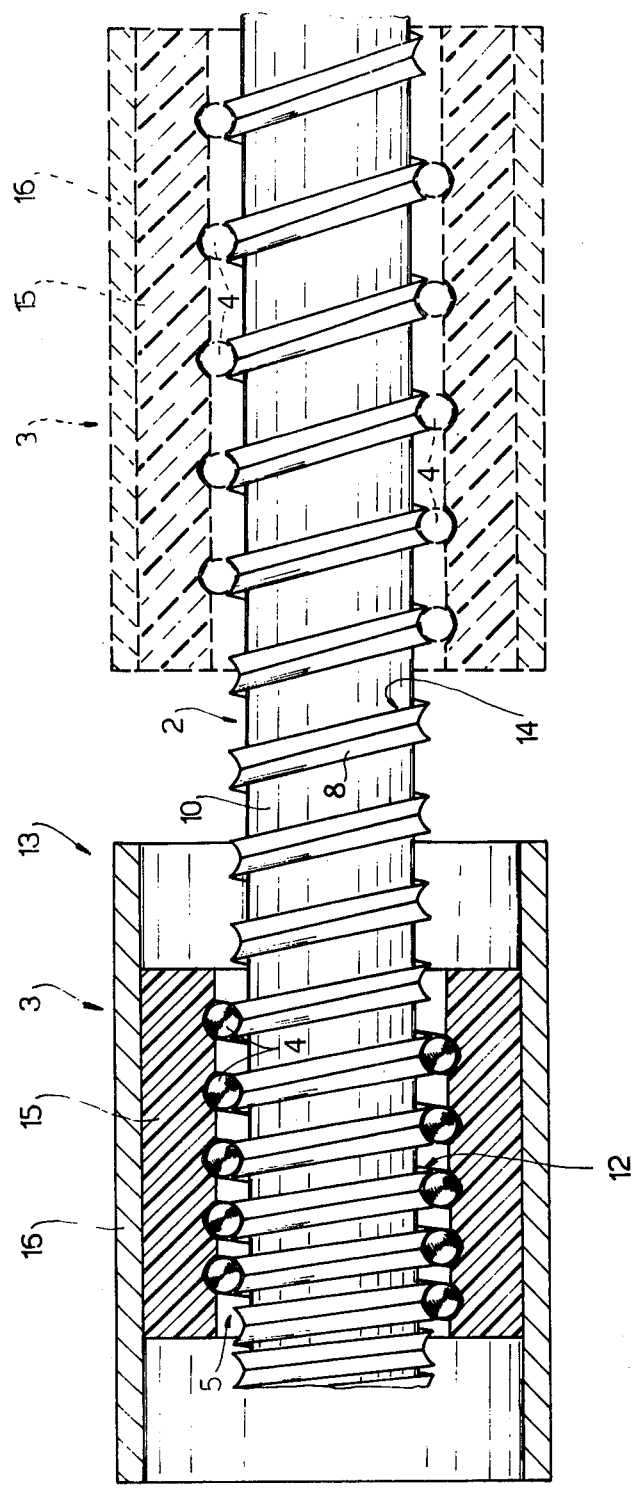
FIG. 3 is an axial section through a second modification of the coupling shown in FIG. 1.
Figure 4:
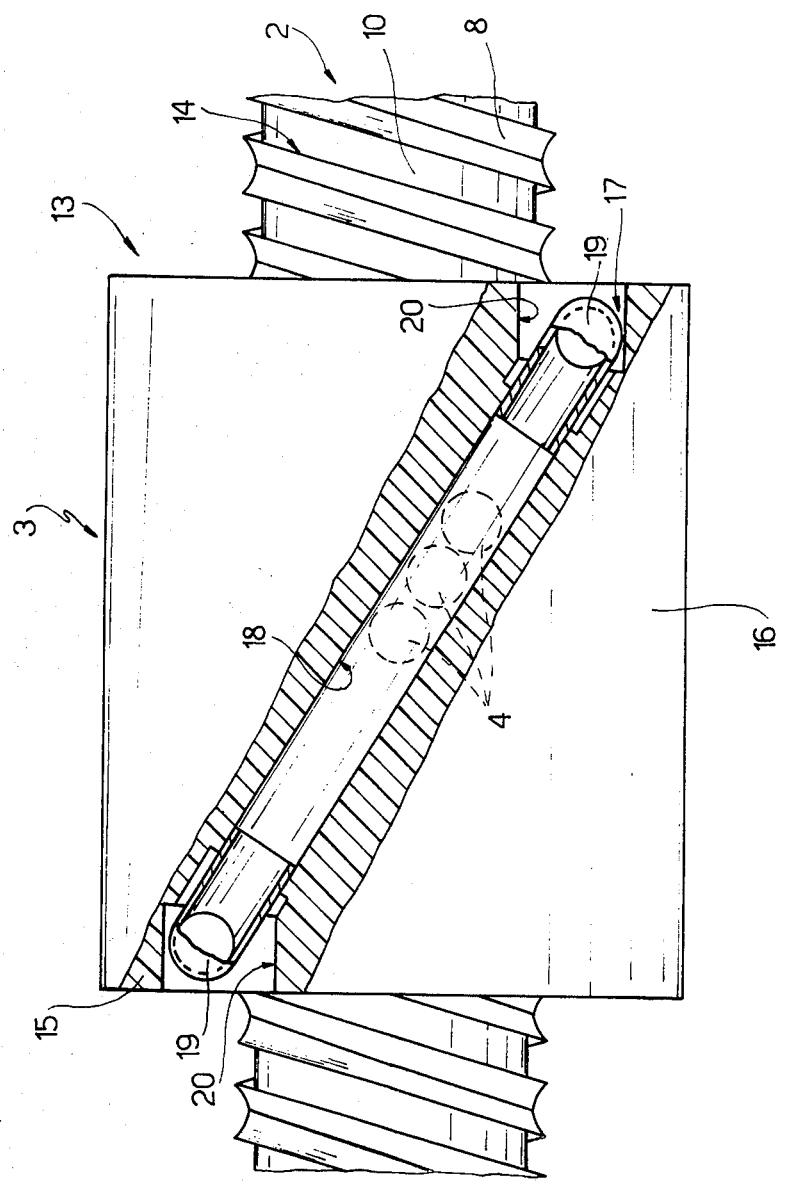
FIG. 4 is a partially sectional diagrammatic view from above of the coupling of FIG. 3.

FIGS. 3 and 4 show a screw-nut screw coupling indicated overall by 13, in which in contrast to the couplings 1 and 11, the strip 8 is wound about the core 10 to form a spring 14 having a pitch which varies in accordance with a determined law along the axis of the core 10. The coupling between such a screw 2 and the relative nut screw 3 is made possible by the fact that, in this latter, the spring 12 is rigidly connected, for example by vulcanisation, to the inner surface of a sleeve 15 of elastically deformable material. This latter is coupled to an outer sleeve 16 of rigid material so that it can deform therein. The sleeve 16, which in certain applications may be dispensed with, may be used for connecting the nut screw 3 to a user item (not shown) or an actuator (not shown), for example a motor.

In a like manner to the sleeve 15, the core 10, which may again be rigid or flexible but must generally have substantial axial rigidity, may also be provided with an element (not shown) for its coupling to a user item (not shown) or to an actuator (not shown), for example a motor.

When the coupling 13 is used for transmitting motion from a drive member to a driven member (not shown), the balls 4 disposed in the track 5 produce axial coupling between the springs 12 and 14 such that, on varying the pitch of the spring 14, a corresponding analogous elongation or shortening occurs, as indicated by the dashed line in FIG. 3, of the spring 12 and relative sleeve 15, with axial deformation of this latter inside the rigid sleeve 16. In other words, during motion the presence of the balls 4 in the track 5 leads to continual adaptation of the pitch of the spring 12 to the pitch of the spring 14. Consequently, by varying the pitch of the spring 14 along the axis of the core 10 in a determined manner, it is possible to produce in the two elements of the coupling a relative velocity which varies in accordance with a law chosen at will, even though a constant speed primary drive is used.

Where, for example, the coupling 13 is connected between a motor and a user item to give this latter a certain reciprocating rotatory or translatory stroke, the portion of the spring 14 coupled to the spring 12 via the balls 4 during each stroke will preferably have a relatively short pitch at its ends, and a relatively long pitch in its middle part. In this manner it is possible to guide said member along its outward and return stroke while limiting stresses due to inertia forces and impact to a minimum.

Where a flexible core 10 is used, the resilience of the sleeve 15 enables the coupling 13 to operate even when the axis of the spring 14 is disposed in a curve. The coupling 11 may also be enabled to operate in this particular manner by replacing the rigid sleeve 9 with the resilient sleeve 14, in accordance with a modification not shown.

In all applications in which a sleeve 15 of resilient material is used, the recirculation of the balls 4 from one end to the other of the path 5 may be obtained by a recirculation channel 17 illustrated diagrammatically in FIG. 4 and comprising a central portion defined by a through bore 18 formed diagonally through the sleeve 15, and two end portions each of which is defined by a respective duct 19 of L shape, one end of which is coupled telescopically to an end portion of the bore 18 and the other end extends into a respective groove 20 provided radially at the end of the sleeve 15. Each duct 19 is connected rigidly to a respective end of the spring 12, for example in the manner illustrated in FIGS. 6 and 7 of said patent application No. 68870-A/76.

Within the principle of the invention, numerous modifications may be made to the embodiments described by way of non-limiting example, without leaving the scope of the present invention.

What I claim is:

1. A screw-nut screw transmission coupling with ball circulation of the type comprising a first elongated element and a second tubular element substantially coaxial to each other and with an external and an internal helical track respectively, said two tracks being disposed facing each other to define a helical rolling path for a plurality of balls disposed in mutual contact along said path and along a recirculation duct connecting the two ends of said path together, in the coupling said first element being constituted by an inner core and a metal strip wound in a cylindrical helix about and along said core, said strip being rigid with said core and having a cross-section which is concave outwards to define one of said helical tracks.

2. A coupling as claimed in claim 1, wherein said core is rigid.

3. A coupling as claimed in claim 1, wherein said core is flexible.

4. A coupling as claimed in claim 1, wherein the other of the tracks is defined by a second metal strip wound in a cylindrical helix along an inner surface of a tubular support member through which said first element extends, said second strip having a cross-section which is concave outwards and being rigid with said tubular member.

5. A coupling as claimed in claim 1, wherein said tubular member is constituted by resilient material.

6. A coupling as claimed in claim 1, wherein said recirculation duct comprises a portion extending diagonally through said tubular member and deformable therewith.

7. A coupling as claimed in claim 5, wherein said tubular member of resilient material is inserted in an axially deformable manner into a rigid sleeve.

8. A coupling as claimed in claim 5, wherein said first strip is wound along and about said second core in a cylindrical helix, the pitch of which varies along said core in accordance with a determined law.

* * * * *